(12) United States Patent
Srinivasan et al.

(10) Patent No.: US 9,286,223 B2
(45) Date of Patent: Mar. 15, 2016

(54) MERGING DEMAND LOAD REQUESTS WITH PREFETCH LOAD REQUESTS

(71) Applicant: ADVANCED MICRO DEVICES, INC., Sunnyvale, CA (US)

(72) Inventors: Sriram Srinivasan, Fort Collins, CO (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 282 days.

(21) Appl. No.: 13/864,542

(22) Filed: Apr. 17, 2013

(65) Prior Publication Data

US 2014/0317356 A1    Oct. 23, 2014

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ........ *G06F 12/0862* (2013.01); *G06F 12/0844* (2013.01); *G06F 12/0857* (2013.01)

(58) Field of Classification Search
CPC ............ G06F 12/0862; G06F 12/0844; G06F 12/0857
USPC .................... 711/137, 204, 133, 118; 712/207
See application file for complete search history.

(56) References Cited

U.S. PATENT DOCUMENTS

| | | | |
|---|---|---|---|
| 2003/0009623 A1* | 1/2003 | Arimilli et al. | 711/119 |
| 2006/0248281 A1* | 11/2006 | Al-Sukhni et al. | 711/137 |
| 2007/0283101 A1* | 12/2007 | El-Essawy et al. | 711/137 |
| 2011/0173400 A1* | 7/2011 | Isono | 711/154 |
| 2013/0054896 A1* | 2/2013 | Colavin | 711/118 |

* cited by examiner

*Primary Examiner* — Tuan Thai
*Assistant Examiner* — Shane Woolwine

(57) ABSTRACT

A processor includes a processing unit, a cache memory, and a central request queue. The central request queue is operable to receive a prefetch load request for a cache line to be loaded into the cache memory, receive a demand load request for the cache line from the processing unit, merge the prefetch load request and the demand load request to generate a promoted load request specifying the processing unit as a requestor, receive the cache line associated with the promoted load request, and forward the cache line to the processing unit.

17 Claims, 5 Drawing Sheets

MERGING DEMAND LOAD REQUESTS WITH PREFETCH LOAD REQUESTS

BACKGROUND OF THE INVENTION

The disclosed subject matter relates generally to computing devices having cache memories and, more particularly, to merging demand load requests with prefetch load requests.

A typical computer system includes a memory hierarchy to obtain a relatively high level of performance at a relatively low cost. Instructions of different software programs are typically stored on a relatively large but slow non-volatile storage unit (e.g., a disk drive unit). When a user selects one of the programs for execution, the instructions of the selected program are copied into a main memory, and a processor (e.g., a central processing unit or CPU) obtains the instructions of the selected program from the main memory. Some portions of the data are also loaded into cache memories of the processor or processors in the system. A cache memory is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units (GPUs) and others, are also known to use caches.

The cache memory closest to the processor core is typically referred to as the L1 cache. A L2 cache may be located on a different die than the processor and L1 cache, and it may be shared across multiple processor cores. When a processor executes a program, it looks in the cache for the data. The data might have been previously used during the course of execution of the program and it may reside in the cache. The act of the processor finding the cache line, which holds the program data or program instructions, in the cache is called a "cache hit." The act of the processor not finding the data or instruction in the cache is called a "cache miss." The processor issues demand load requests to load cache lines into the cache on a cache miss. These demand load requests read cache lines from the system memory and store copies of them in caches that are accessible by the processor. The act of storing a copy of a cache line in a cache is referred to as "filling a cache line" into the cache. To improve performance, prefetching is used to predict that a processor core will need a cache line prior to it actually requesting data from that cache line using a demand load request. A prefetch unit implemented by hardware monitors the data patterns of the core and predicts future cache lines that will likely be needed.

The goal of prefetching is to fill the cache line prior to a demand load request targeting the cache line being serviced. If the cache line can be successfully prefetched, the latency for the later demand load request can be reduced because the demand load request will not see a cache miss. However, in some cases, the demand load request is processed before the cache line fill for the prefetch load can be completed, so the demand load request is queued behind the prefetch load request. The demand load request must wait for the cache line fill to complete prior to being serviced. For cache line fills, the data can be forwarded to the requestor in parallel with the cache line being entered into the cache. If a prefetch had not been implemented, the demand load request would have encountered a cache miss and would been eligible for data forwarding during the cache fill. On the other hand, if prefetching is implemented by the hardware, the demand load request may be received sometime shortly after the prefetch load request has been issued, but before the cache line fill for the prefetch load request has completed. In such cases, when the cache line fill happens, which is done on behalf of the prefetch load request, the data is not forwarded to the requesting processor that issued the demand load request. In these cases, the latency seen by the demand load request to obtain data after the cache line fill completes for the prefetch load request could be greater than it would have been if there had been no prior prefetch load request for this cache line.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of only some aspects of embodiments of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments include a processor having a processing unit, a cache memory, and a central request queue. The central request queue is operable to receive a prefetch load request for a cache line to be loaded into the cache memory, receive a demand load request for the cache line from the processing unit, merge the prefetch load request and the demand load request to generate a promoted load request specifying the processing unit as a requestor, receive the cache line associated with the promoted load request, and forward the cache line to the processing unit.

Some embodiments include a method including receiving a prefetch load request for a cache line to be loaded into a cache memory. A demand load request for the cache line is received from a processing unit. The prefetch load request and the demand load request are merged to generate a promoted load request specifying the processing unit as a requestor. The cache line associated with the promoted load request is received and the cache line is forwarded to the processing unit.

BRIEF DESCRIPTION OF THE DRAWINGS

The disclosed subject matter will hereafter be described with reference to the accompanying drawings, wherein like reference numerals denote like elements, and.

Figure 1:
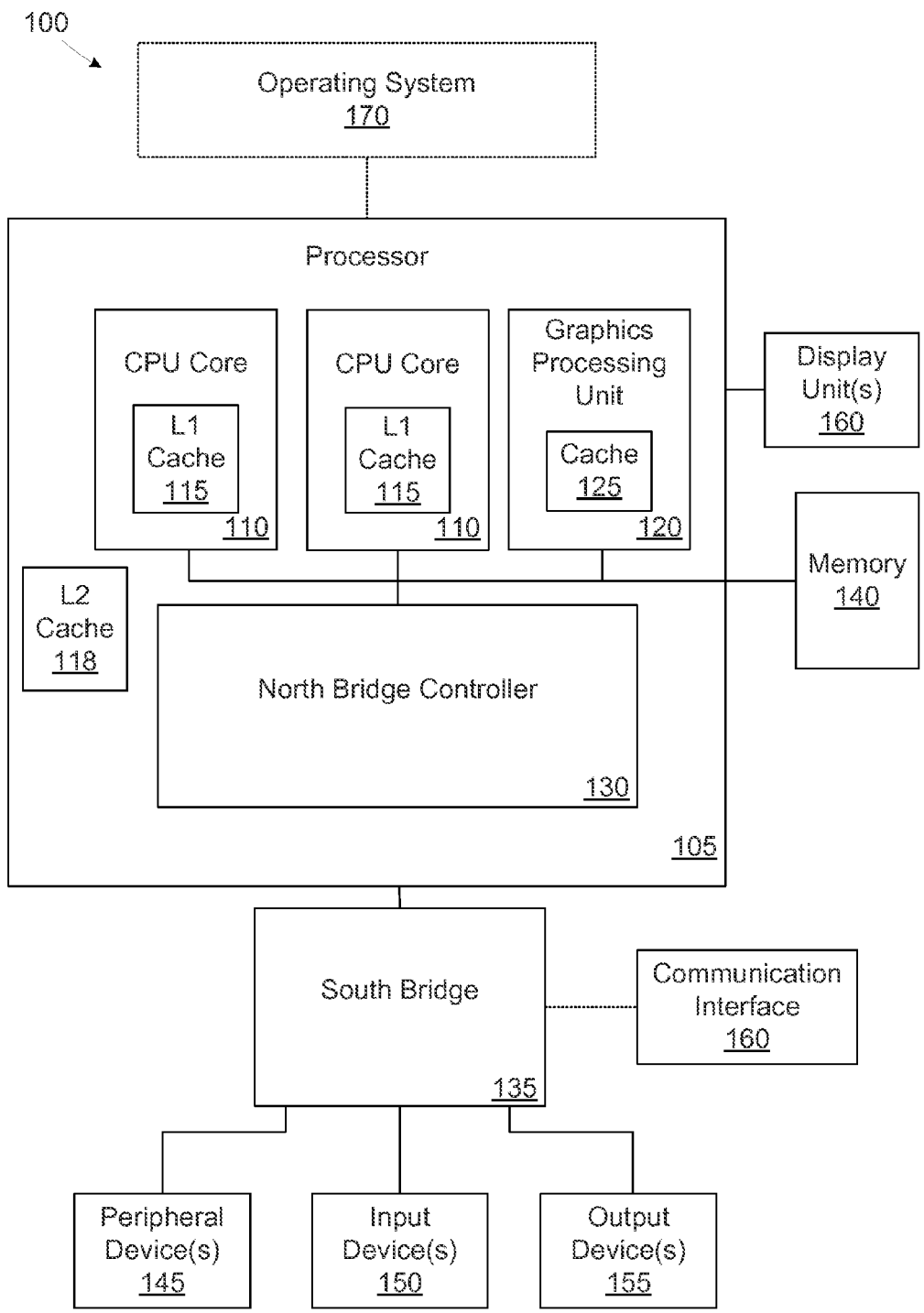
FIG. 1 is a simplified block diagram of a computer system operable to manage cache memories using shred fill and eviction buffers, according to some embodiments.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 including an accelerated processing unit (APU) 105. The APU 105 includes one or more central processing unit (CPU) cores 110, a graphics processing unit (GPU) 120, and their associated caches 115, 118, 125 (e.g., L1, L2, L3, or other level cache memories), a north bridge (NB) controller 130. The system 100 also includes a south bridge (SB) 135, and system memory 140 (e.g., DRAM). The NB controller 125 provides an interface to the south bridge 130 and to the system memory 135. To the extent certain exemplary aspects of the cores 110 and/or one or more cache memories 115, 118, 125 are not described herein, such exemplary aspects may or may not be included in various embodiments without limiting the spirit and scope of the embodiments of the present subject matter as would be understood by one of skill in the art.

In some embodiments, the computer system 100 may interface with one or more peripheral devices 145, input devices 150, output devices 155, and/or display units 160. A communication interface 165, such as a network interface circuit (NIC), may be connected to the south bridge 135 for facilitating network connections using one or more communication topologies (wired, wireless, wideband, etc.). It is contemplated that in various embodiments, the elements coupled to the south bridge 135 may be internal or external to the computer system 100, and may be wired, such as illustrated as being interfaces with the south bridge 135, or wirelessly connected, without affecting the scope of the embodiments of the present subject matter. The display units 160 may be internal or external monitors, television screens, handheld device displays, and the like. The input devices 150 may be any one of a keyboard, mouse, track-ball, stylus, mouse pad, mouse button, joystick, scanner or the like. The output devices 155 may be any one of a monitor, printer, plotter, copier or other output device. The peripheral devices 145 may be any other device which can be coupled to a computer: a CD/DVD drive capable of reading and/or writing to corresponding physical digital media, a universal serial bus ("USB") device, Zip Drive, external floppy drive, external hard drive, phone, and/or broadband modem, router, gateway, access point, and/or the like. To the extent certain example aspects of the computer system 100 are not described herein, such example aspects may or may not be included in various embodiments without limiting the spirit and scope of the embodiments of the present application as would be understood by one of skill in the art. The operation of the system 100 is generally controlled by an operating system 170 including software that interfaces with the various elements of the system 100. In various embodiments the computer system 100 may be a personal computer, a laptop computer, a handheld computer, a tablet computer, a mobile device, a telephone, a personal data assistant ("PDA"), a server, a mainframe, a work terminal, a music player, smart television, and/or the like.

Instructions of different software programs are typically stored on a relatively large but slow non-volatile storage unit (e.g., internal or external disk drive unit). When a user selects one of the programs for execution, the instructions and data associated with the selected program are copied into the system memory 140, and the processor 105 obtains the instructions and data for the selected program from the system memory 140. Some portions of the data are also loaded into cache memories 115 of one or more of the cores 110 to facilitate faster retrieval and processing.

The caches 115, 118, 125 are smaller and faster memories (i.e., as compared to the system memory 140) that store copies of instructions and/or data that are expected to be used relatively frequently during normal operation. The cores 110 and/or the GPU 120 may employ a hierarchy of cache memory elements.

Instructions or data that are expected to be used by a processing unit 110, 120 during normal operation are moved from the relatively large and slow system memory 140 into the cache 115, 120. When the processing unit 110, 120 needs to read or write a location in the system memory 140, control logic for the cache 115, 125 first checks to see whether the desired memory location is included in the cache 115, 125. If this location is included in the cache 115, 118, 125 (i.e., a cache hit), then the processing unit 110, 120 can perform the read or write operation on the copy in the cache 115, 125. If this location is not included in the cache 115, 125 (i.e., a cache miss), then the processing unit 110, 120 needs to access the information stored in the system memory 140 and, in some cases, the information may be copied from the system memory 140 and added to the cache 115, 118, 125. Proper configuration and operation of the caches 115, 118, 125 can reduce the latency of memory accesses below the latency of the system memory 135 to a value close to the value of the cache memory 115, 118, 125.

Figure 2:
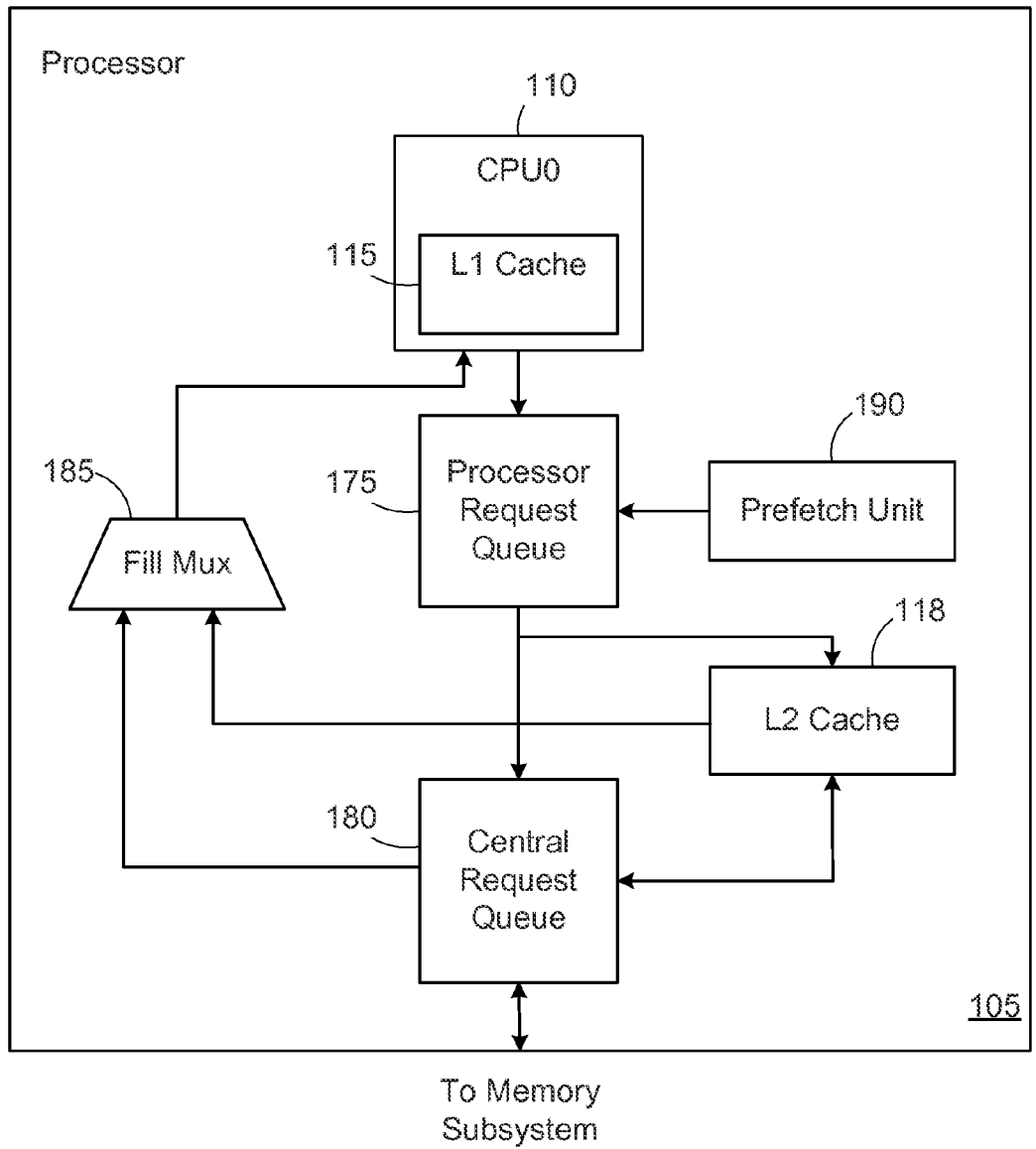
FIG. 2 is a simplified diagram of a processor in the system of FIG. 1, according to some embodiments.

FIG. 2 is a block diagram illustrating the cache hierarchy employed by the processor 105, according to some embodiments. Although the cache hierarchy is illustrated for one of the cores 110, it is also contemplated that a similar hierarchy may also be used for the GPU 120. The processor 105 employs a hierarchical cache. Each core 110 has its own L1 cache 115 and the cores 110 share an associated L2 cache 118. In some embodiments, the GPU 120 may also share the L2 cache 118. The system memory 140 is downstream of the L2 cache 118. A particular core 110 first attempts to locate needed memory locations in the L1 cache 115. The illustrated L1 cache 115 and L2 cache 118 blocks are intended to represent the cache memory array and any associated control logic. Hence, if it stated that the L1 cache 115 reports a cache miss, it intended to represent that the L1 cache control logic had determined that the requested data is not present in the cache memory array. The cache logic may maintain an index (e.g., tag array) for recording what data is stored in the cache memory array.

Although the hierarchy is illustrated as having a two level cache, in some embodiments, additional levels may be provided. For example, multiple CPU clusters may be provided, where each core in a cluster has its own L1 cache 115, and each cluster shares a L2 cache 118. A L3 cache may be provided for sharing by the multiple clusters. In some embodiments, the L1 cache 115 can be further subdivided into separate L1 caches for storing instructions, L1-I, and data, L1-D. Frequently used instructions are copied from the L2 cache 118 into the L1-I cache and frequently used data can be copied from the L2 cache 118 into the L1-D cache. The L1-I cache can be placed near entities that require more frequent access to instructions than data, whereas the L1-D cache can be placed closer to entities that require more frequent access to data than instructions. The L2 cache 118 is typically associated with both the L1-I and L1-D caches.

A processor request queue 175 stores load requests from the core 110 until they can be serviced by the L2 cache 118 or dispatched to a central request queue 180 for servicing by the memory subsystem. For example, the memory subsystem may include a L3 cache, if employed, the system memory 140, magnetic or optical storage peripheral device 145, etc. Additional cores 110 may have their own L1 caches 115 and processor request queues 175 and may share the L2 cache 118 and the central request queue 180.

A fill multiplexer 185 is used to select the data source for fills to the L1 cache 115. Data residing in the L2 cache 118 may be sent to the L1 cache 115 via the fill multiplexer 185. Data received from the memory subsystem may be sent by the central request queue 180 to the fill multiplexer 185 when it is received. The central request queue 180 may also send the received data to the L2 cache 118 in parallel with the data being forwarded to the fill multiplexer 185. In this manner, the L1 cache 115 does not need to wait for the L2 cache 118 to be filled before receiving the data.

A prefetch unit 190 may generate load requests to speculatively prefetch lines into the L2 cache 118. The prefetch unit 190 monitors memory requests associated with applications running in the processor 105 to determine or predict that the processor 105 is likely to access a particular sequence of memory addresses in the system memory 140. For example, the prefetch unit 190 may detect sequential memory accesses by the processor 105 by monitoring previous cache misses. The prefetch unit 190 may then fetch the information from locations in the system memory 140 in a sequence (and direction) determined by the misses and store this information in the L2 cache 118 so that the information is available before it is requested by the processor 105. The prefetch unit 190 can keep track of multiple streams run by multiple cores 110 and independently prefetch data for the different streams and/or cores 110.

Figure 3:
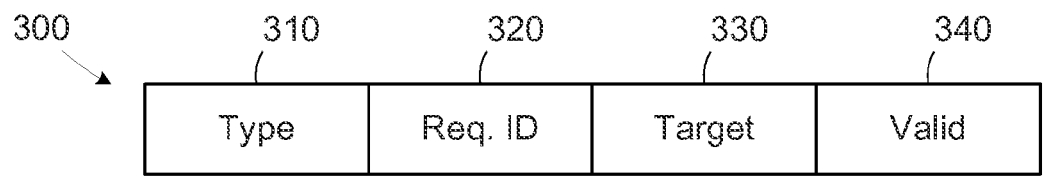
FIG. 3 is a diagram of a load request entry, according to some embodiments.

For load requests from the core 110, the L1 cache 115 is first checked to determine if the data is present. If a L1 cache miss is received, the load request is stored in the processor request queue 175. FIG. 3 is a diagram illustrating an exemplary load request 300, according to some embodiments. The load request 300 includes a type field 310 indicating whether the load request is a demand load request (i.e., requested by an active process executing on a core 110) or a prefetch load request. A requestor ID field 320 indicates the requesting entity, such as one of the cores 110, the GPU 120, or the prefetch unit 190. The type field 310 may not be necessary if it is possible to determine if a load request is a demand load request or a prefetch load request based on the value of the requestor ID field 310. A target address field 330 specifies the address of the data requested, and a valid indicator field 340 (e.g., valid bit) specifies if the load request is valid. The valid indicator field 340 is set when the load request is entered and cleared when the load request completes. New load requests may be entered over existing entries with cleared valid indicator field 340 values.

Load requests from the core 110 may be designated as demand load requests in the type field 310, and the core 110 may be identified in the requestor ID field 320. For prefetch load requests generated by the prefetch unit 190, the type field 310 may be designated as prefetch, and the prefetch unit 190 or the L2 cache 118 may be designated in the requestor ID field 320.

Prefetch and demand load requests 300 are stored in the processor request queue 175. The load request 300 passes down to the L2 cache 118. If a L2 cache hit is received, the data is sent to the core 110 via the fill multiplexer 185, and the load request 300 is cleared by clearing the valid indicator field 340. If a miss is registered by the L2 cache 118, the load request 300 is sent to the central request queue 180 for retrieval from the memory subsystem when space is available. The load request 300 is removed from the processor request queue 175 when it is accepted by the central request queue 180. When the data is returned, the central request queue 180 passes the data to the core 110 via the fill multiplexer 185 and also sends the data to the L2 cache 118 in parallel.

Figure 4:
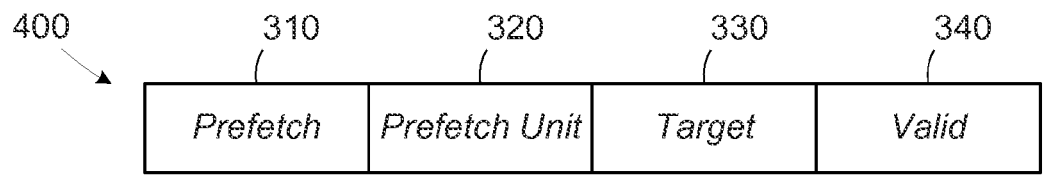
FIG. 4 illustrates the promotion of the prefetch load request to a demand load request, according to some embodiments.
Figure 4:
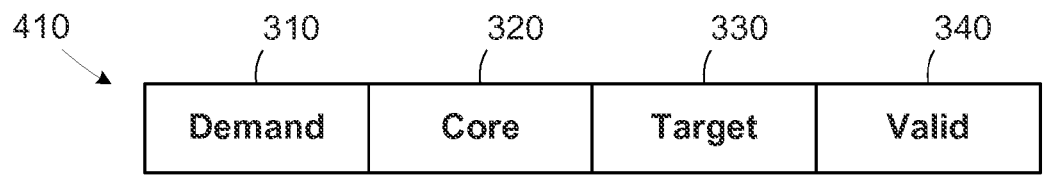
Figure 4:
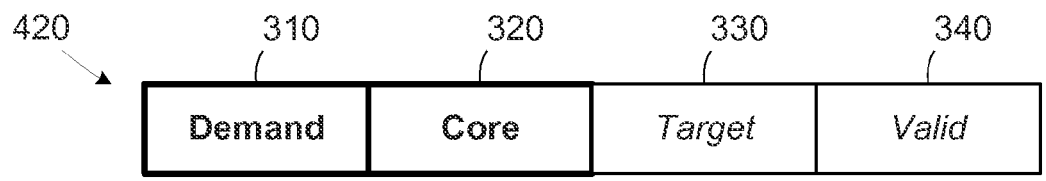

To avoid making a demand load request to wait for a prefetch load request to complete before it can be serviced, the central request queue 180 is operable to promote a prefetch load request to a demand load request, as described in reference to FIGS. 4. FIG. 4 illustrates an exemplary prefetch load request 400 issued by the prefetch unit 190. The prefetch load request 400 is entered into the central request queue 180. Prior to the prefetch load request being completed, a demand load request 410 is received in the processor request queue 175 that targets the same cache line as the prefetch load request 400. Rather than rejecting the demand load request 410 from the processor request queue 175 as targeting the same cache line as the prefetch load request 400, the central request queue 180 promoted the prefetch load request 400 by merging the demand load request 410 with the prefetch load request 400. The central request queue 180 overwrites the type field 310 and the requestor ID field 320, as illustrated in the promoted load request 420. After the demand load request 410 is accepted by the central request queue 180, it can be removed from the processor request queue 175, thereby freeing another entry for a different request.

Because, the demand load request 410 is merged into the existing prefetch load request 400, the promoted load request 420 is seen as being the same age as the original prefetch load request 400 for priority purposes. Also, if the central request queue 180 is configured to prioritize demand load requests over prefetch load requests, the promotion increases the relative priority of the previous prefetch load request 400 due to the change in the type field 310.

When the fill data for the cache line is received from the memory subsystem, the central request queue 180 forwards the data to the requestor identified in the requestor ID field 320, which was changed to the core 110 by the promotion of the prefetch load request 400.

In some embodiments, the processor request queue 175 may be omitted. Demand load requests or prefetch load requests from the core 110 or the prefetch unit 190 are sent directly to the L2 cache 118. For the case of a prefetch load request, a miss in the L2 cache results in a prefetch load request entry being entered into the central request queue 180. A subsequent demand load request targeting the same cache line may be merged with the prefetch load request present in the central request queue 180 as described above.

Figure 5:
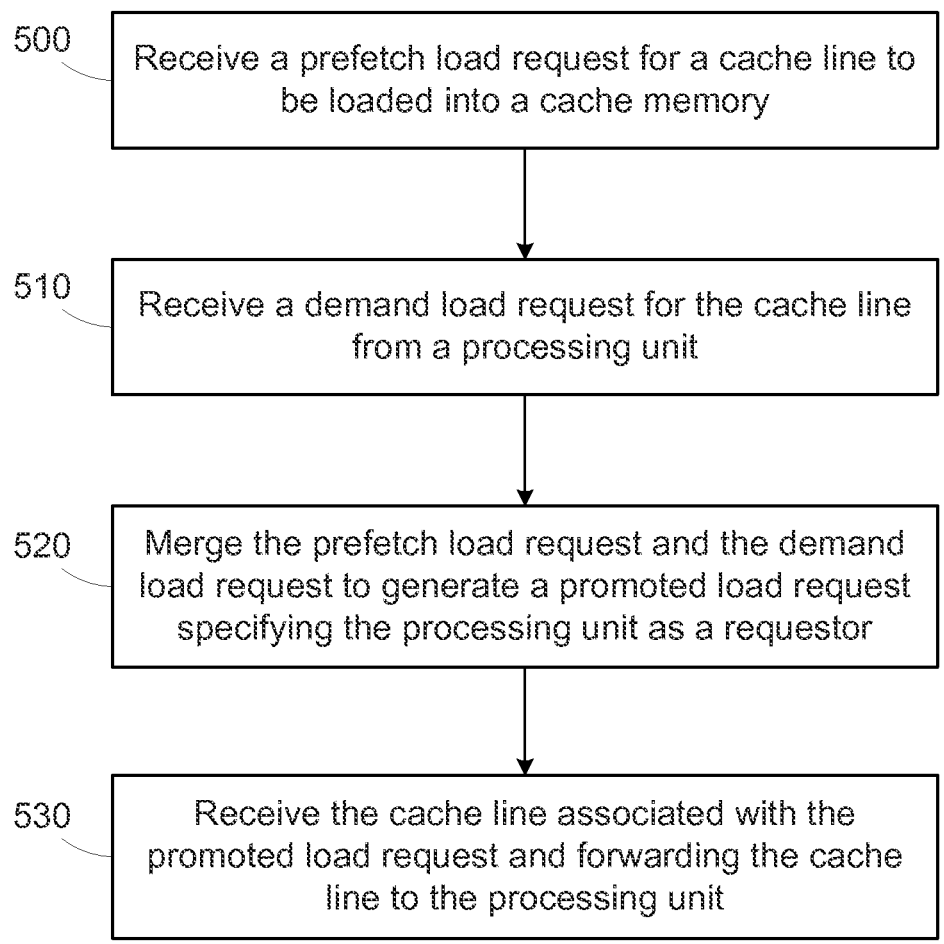
FIG. 5 is a simplified flow diagram of a method for promoting prefetch load requests, according to some embodiments.

FIG. 5 is a simplified flow diagram of a method for performing prefetch load request promotion, according to some embodiments. In block 500, a prefetch load request for a cache line to be loaded into a cache memory is received. In block 510, a demand load request for the cache line is received from a processing unit. In the context of the previous illustrations, the processing unit may be the processor core 110 or the GPU 120. In block 520, the prefetch load request and the demand load request are merged to generate a promoted load request specifying the processing unit as a requestor. In block 530, the cache line associated with the promoted load request is received and the cache line is forwarded to the processing unit.

Although the prefetch promotion described herein is illustrated for L2 cache prefetches, it may also be implemented for a L1 cache. Hence, the cache for which prefetching and promotion is being conducted may reside within the processor core 110 itself. In that context, the processing unit may be internal to the core, such as the execution pipeline. The received data may be delivered to the L1 cache in parallel with forwarding the data to the execution pipeline.

Figure 6:
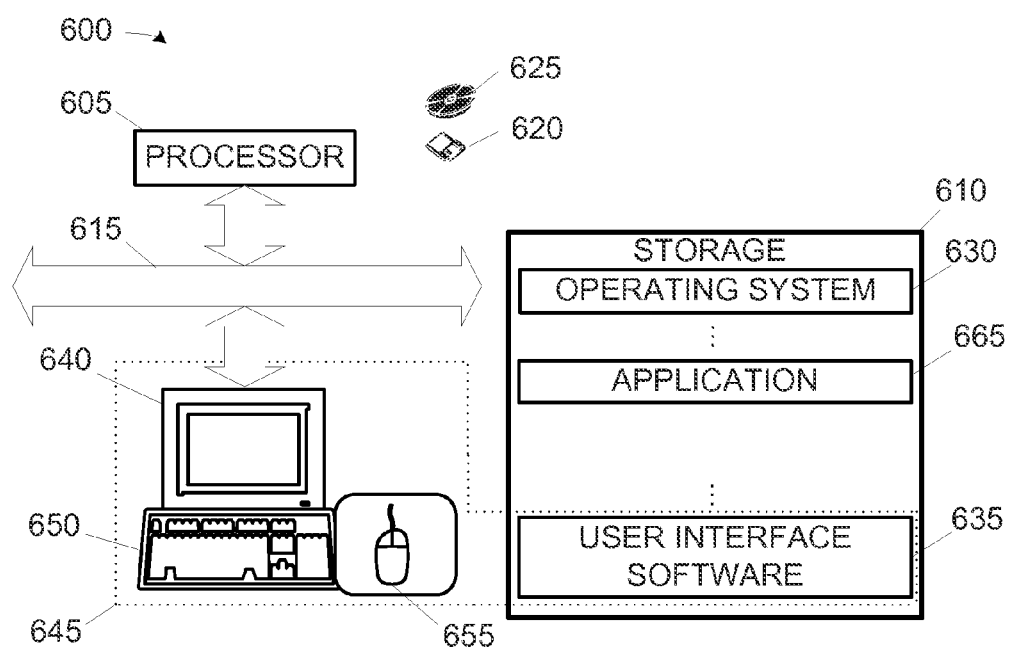
FIG. 6 is a simplified diagram of a computing apparatus that may be programmed to direct the fabrication of the integrated circuit device of FIGS. 1 and 2, according to some embodiments.

FIG. 6 illustrates a simplified diagram of selected portions of the hardware and software architecture of a computing apparatus 600 such as may be employed in some aspects of the present subject matter. The computing apparatus 600 includes a processor 605 communicating with storage 610 over a bus system 615. The storage 610 may include a hard disk and/or random access memory (RAM) and/or removable storage, such as a magnetic disk 620 or an optical disk 625. The storage 610 is also encoded with an operating system 630, user interface software 635, and an application 640. The user interface software 635, in conjunction with a display 645, implements a user interface 650. The user interface 650 may include peripheral I/O devices such as a keypad or keyboard 655, mouse 660, etc. The processor 605 runs under the control of the operating system 630, which may be practically any operating system known in the art. The application 640 is invoked by the operating system 630 upon power up, reset, user interaction, etc., depending on the implementation of the operating system 630. The application 640, when invoked, performs a method of the present subject matter. The user may invoke the application 640 in conventional fashion through the user interface 650. Note that although a stand-alone system is illustrated, there is no need for the data to reside on the same computing apparatus 600 as the simulation application 640 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a non-transitory computer readable storage device (e.g., storage 610, disks 620, 625, solid state storage, and the like). The non-transitory program storage device may be programmed with instructions, that when executed by a processor, perform one or more of the techniques described herein.

In one embodiment, the GDSII data (or other similar data) may be adapted to configure a manufacturing facility (e.g., through the use of mask works) to create devices capable of embodying various aspects of the disclosed embodiments. In other words, in various embodiments, this GDSII data (or other similar data) may be programmed into the computing apparatus 600, and executed by the processor 605 using the application 665, which may then control, in whole or part, the operation of a semiconductor manufacturing facility (or fab) to create semiconductor products and devices. For example, in one embodiment, silicon wafers containing portions of the computer system 100 illustrated in FIGS. 1-2 may be created using the GDSII data (or other similar data) as directed by instructions stored on a non-transitory program storage device.

Promoting prefetch load requests to demand load requests has numerous advantages. Promotion reduces the effective latency of servicing for CPU core demand load requests. Promoting the demand load request merges two requests into a single request, thereby allowing newer requests to be sent from the CPU core. Power consumption is reduced compared to designs where the demand load request is continuously replayed from the processor request queue to the L2 cache, where it is rejected due to address collision. Promotion also saves one additional lookup of the L2 cache compared to a design that does not implement prefetch promotion, since such a design would need to read the L2 cache one more time to retrieve the data needed for the CPU demand load request.

This situation also translates to additional power savings in a design that implements prefetch promotion.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A processor, comprising:
   a processing unit;
   a cache memory;
   a central request queue operable to receive a prefetch load request for a cache line to be loaded into the cache memory, receive a demand load request for the cache line from the processing unit, merge the prefetch load request and the demand load request to generate a promoted load request specifying the processing unit as a requestor, receive the cache line associated with the promoted load request, and forward the cache line to the processing unit; and
   a processor request queue operable to store the demand load request, wherein the central request queue is operable to merge the prefetch load request and the demand load request to generate the promoted load request in the central request queue and is operable to delete the demand load request from the processor request queue in response to generating the promoted load request.

2. The processor of claim 1, wherein the central request queue is operable to send the cache line to the cache memory in parallel with forwarding the cache line to the processing unit.

3. The processor of claim 1, wherein the prefetch load request has a type field specifying a prefetch load type, and the central request queue is operable to merge the prefetch load request and the demand load request to generate the promoted load request having a type field specifying a demand load type.

4. The processor of claim 3, wherein the prefetch load request has a requestor identification field specifying a prefetch unit, and the central request queue is operable to merge the prefetch load request and the demand load request to generate the promoted load request having a requestor identification field specifying the processing unit.

5. The processor of claim 1, further comprising a prefetch unit, wherein the prefetch load request has a requestor identification field specifying a prefetch unit, and the central request queue is operable to merge the prefetch load request and the demand load request to generate the promoted load request having a requestor identification field specifying the processing unit.

6. The processor of claim 1, further comprising a multiplexer having inputs coupled to the cache memory and the central request queue and an output coupled to the processing unit, and the central request queue is operable to configure the multiplexer to select the input coupled to the central request queue.

7. The processor of claim 1, wherein the processing unit comprises a processor core.

8. The processor of claim 7, wherein the processor core comprises a level 1 cache memory, and the cache memory comprises a level 2 cache memory.

9. The processor of claim 1, wherein the promoted load request has an age corresponding to an age of the prefetch request.

10. A method, comprising:
    receiving a prefetch load request for a cache line to be loaded into a cache memory;
    storing the prefetch load request in a central request queue;
    receiving a demand load request for the cache line from a processing unit;
    storing the demand load request in a processor request queue;
    merging the prefetch load request and the demand load request to generate a promoted load request specifying the processing unit as a requestor, wherein the merging of the prefetch load request and the demand load request comprises generating the promoted load request in the central request queue;
    deleting the demand load request from the processor request queue in response to generating the promoted load request; and
    receiving the cache line associated with the promoted load request and forwarding the cache line to the processing unit.

11. The method of claim 10, wherein merging comprises merging the prefetch load request and the demand load request so that the promoted load request has an age corresponding to an age of the prefetch load request.

12. The method of claim 10, wherein the prefetch load request has a type field specifying a prefetch load type, and merging the prefetch load request and the demand load request further comprises generating the promoted load request having a type field specifying a demand load type.

13. The method of claim 12, wherein the prefetch load request has a requestor identification field specifying a prefetch unit, and merging the prefetch load request and the demand load request further comprises generating the promoted load request having a requestor identification field specifying the processing unit.

14. The method of claim 10, wherein the prefetch load request has a requestor identification field specifying a prefetch unit, and merging the prefetch load request and the demand load request further comprises generating the promoted load request having a requestor identification field specifying the processing unit.

15. The method of claim 10, wherein forwarding the cache line to the processing unit further comprising configuring a multiplexer having inputs coupled to the cache memory and the central request queue and an output coupled to the processing unit to select the input coupled to the central request queue.

16. The method of claim 15, further comprising deleting the demand load request from the processor request queue in response to generating the promoted load request.

17. A non-transitory computer readable storage device encoded with data that, when implemented in a manufacturing facility, adapts the manufacturing facility to create a processor, comprising:
    a processing unit;
    a cache memory;
    a central request queue operable to receive a prefetch load request for a cache line to be loaded into a cache memory, receive a demand load request for the cache line from the processing unit, merge the prefetch load request and the demand load request to generate a promoted load request specifying the processing unit as a requestor, receive the cache line associated with the promoted load request, and forward the cache line to the processing unit; and a processor request queue operable to store the demand load request, wherein the central request queue is operable to merge the prefetch load request and the demand load request to generate the promoted load request in the central request queue and is operable to delete the demand load request from the processor request queue in response to generating the promoted load request.

* * * * *